United States Patent [19]
Kim

[11] Patent Number: 6,119,225
[45] Date of Patent: Sep. 12, 2000

[54] POWER SWITCHING DEVICE AND METHOD OF DISPLAY MONITOR THROUGH RESET OF MICROCOMPUTER

[75] Inventor: Kook-Won Kim, Seoul, Rep. of Korea

[73] Assignee: SamSung Electronics Co., Ltd., Suwon, Rep. of Korea

[21] Appl. No.: 09/086,342

[22] Filed: May 29, 1998

[30] Foreign Application Priority Data

May 29, 1997 [KR]  Rep. of Korea ...................... 97-21525

[51] Int. Cl.[7] .............................. G06F 15/177; G06F 1/32
[52] U.S. Cl. ................................................. 713/1; 713/320
[58] Field of Search .................... 713/1, 2, 300, 713/320, 330

[56] References Cited

U.S. PATENT DOCUMENTS

| | | | |
|---|---|---|---|
| 5,097,249 | 3/1992 | Yamamoto | 340/310 |
| 5,521,854 | 5/1996 | Kadowaki | 364/492 |
| 5,721,934 | 2/1998 | Scheeurich | 395/750 |
| 5,845,136 | 12/1998 | Babcock | 395/651 |
| 5,892,942 | 4/1999 | Ohnishi | 375/651 |

*Primary Examiner*—Joseph E. Palys
*Assistant Examiner*—Nitin Patel
*Attorney, Agent, or Firm*—Robert E. Bushnell, Esq.

[57] ABSTRACT

A method and device which powerswitches a display monitor through the reset of a microcomputer is adapted to interrupt the latch up caused during the use of a soft power key by reading the power state of the display monitor before latch up from a memory, and switching the power state to the state before the latch up of the display monitor. The device includes: a soft power key section for generating a reset signal; an EPROM for storing data concerning the power on/off state of the display monitor before the operation of the soft power key section; a microcomputer for generating a power-off signal with the use of the soft power key section and, if a latch up occurs during the use of the soft power key section, reading the power on/off state data stored in the EPROM and switching the power state of the display monitor to the state before the latch up; and a power supply circuit section controlled according to the presence of the power-off signal generated by the microcomputer, and switching the output of a DC voltage.

13 Claims, 3 Drawing Sheets

POWER SWITCHING DEVICE AND METHOD OF DISPLAY MONITOR THROUGH RESET OF MICROCOMPUTER

CLAIM OF PRIORITY

This application makes reference to, incorporates the same herein, and claims all benefits accruing under 35 U.S.C. § 119 from an application for POWER SWITCHING DEVICE AND METHOD OF DISPLAYMONITOR THROUGH RESET OF MICROCOMPUTER earlier filed in the Korean Industrial Property Office on the May 29$^{th}$ 1997 and there duly assigned Ser. No. 21525/1997.

BACKGROUND OF THE INVENTION

1. Technical Field

The present invention generally relates to a device for and method of switching the power of a display monitor through the reset of a microcomputer. More particularly, the present invention relates to a device and method for powerswitching a display monitor through the reset of a microcomputer which is adapted to switch the power state of the display monitor to the state before the reset of the microcomputer by means of a soft power key.

2. Related Art

As electric and electronic technologies have developed, there has been a tendency toward use of a microcomputer with most system equipment. A microcomputer makes it possible to manage system equipment more efficiently for the better convenience of users.

In particular, in order to save power consumed in a display monitor, a microcomputer is typically under the control of a display power management signaling (DPMS) mode. In that mode, the microcomputer enters a stand-by mode to interrupt the video signals provided to the monitor if the horizontal sync signal is "off" and enters a suspend mode to interrupt the deflection voltage provided to the monitor if the vertical sync signal is "off".

Once the horizontal and vertical sync signals are interrupted, the DPMS offmode is activated to interrupt the power supply in order to reduce power consumption by the display monitor.

In recent time, the display monitor has been reset by use of a soft power key, but erroneous operation of this soft power key may cause "latch up". When the latch up is caused by the use of the soft power key, it becomes impossible to reset the display monitor with the key, and this is a problem for the user.

Therefore, there is a need for the development of a device and method for power switching a display monitor through the reset of a microcomputer, wherein the power state before the use of a soft power key is memorized in a memory of the display monitor, and the power state of the display monitor is switched to a new state before latch up.

SUMMARY OF THE INVENTION

An object of the present invention is to provide a powerswitching device and method for a display monitor through the reset of a microcomputer, wherein the power state before the use of a soft power key is memorized in an erasable programmable read-only memory (EPROM) of the display monitor and the power state of the display monitor is switched to the new state before latch up.

To achieve these and other advantages and in accordance with the purpose of the present invention, as embodied and broadly described, a powerswitching device of a display monitor through the reset of a microcomputer includes: a soft power key section for generating a reset signal; an EPROM for storing data concerning the power-on/off state of the display monitor before the operation of the soft power key section; a microcomputer for generating a power-off signal with the use of the soft power key section and, if a latch up occurs during the use of the soft power key section, reading the power on/off state data stored in the EPROM and switching the power state of the display monitor to the new state before the latch up; and a power supply circuit section controlled according to the presence of the power-off signal generated by the microcomputer, and switching the output of a DC voltage.

In another aspect of the present invention, a powerswitching method of a display monitor through the reset of a microcomputer includes the steps of: resetting the microcomputer in response to a switch signal of a soft power key section; checking the power-on/off state of the microcomputer before the reset; if the microcomputer before reset is in the power-off state, reading the power-on state from an EPROM; turning on the power of the display monitor; if the microcomputer before reset is in the power-on state, reading the power-off state from the EPROM; and turning off the power of the display monitor.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent an the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1:
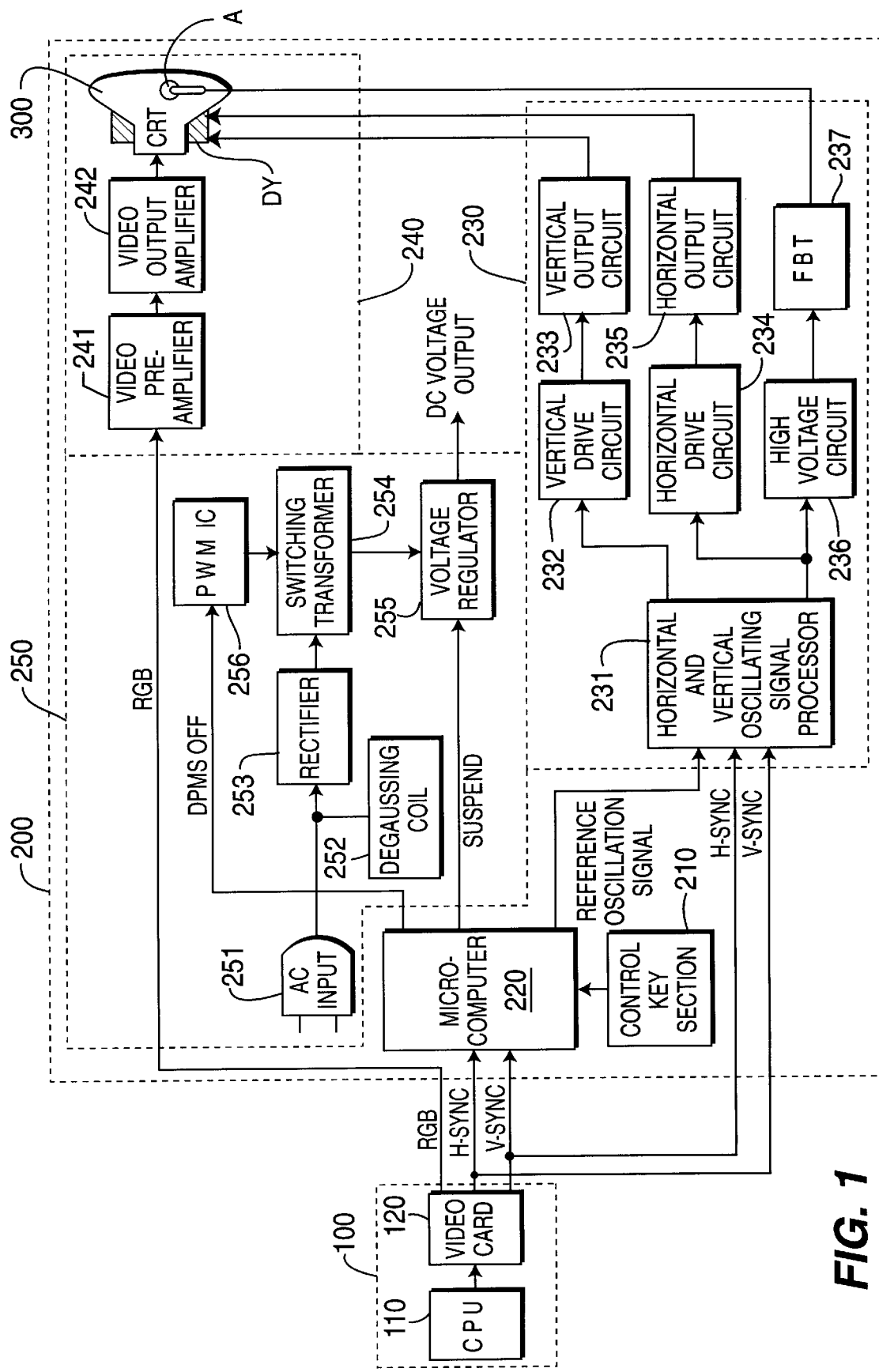
FIG. 1 is a block diagram of the internal circuit of a display monitor.

FIG. 1 is a block diagram showing the internal circuit of a display monitor. As shown in FIG. 1, computer 100 is composed of a CPU 110 for processing a keyboard signal and thereby generating output data, and a video card 120 for processing the data received from the CPU 110 into R, G and B video signals and further generating horizontal and vertical sync signals H-SYNC and V-SYNC, respectively, which are to synchronize the R, G and B video signals.

Display monitor 200, which receives the R, G and B video signals generated by the video card 120 in the computer 100, comprises: a control key section 210 for generating a key signal for controlling the screen of the display monitor 200; a microcomputer 220 for generating an image adjusting signal and a reference oscillating signal in response to the key signal generated by the control key section 210; a horizontal and vertical output circuit section 230 responsive to the image adjusting signal and the reference oscillating signal generated by the microcomputer 220 for synchronizing the R, G and B video signals; a video circuit section 240 for boosting the R, G and B video signals generated by the video card 120 and displaying them; and a power supply circuit section 250 for supplying a drive voltage to microcomputer 220, horizontal and vertical output circuit section 230, and video circuit section 240.

Below is given a detailed description of the respective blocks in the display monitor 200.

Microcomputer 220 is responsive to the horizontal and vertical sync signals H-SYNC and V-SYNC, respectively, transferred from the video card 120 for generating an image adjusting signal and a reference oscillating signal in response to the key signal applied from the control key section 220.

Upon receipt of the image adjusting signal and the reference oscillating signal generated by the microcomputer 220, a horizontal and vertical oscillating signal processor 231 generates horizontal and vertical oscillating pulses for controlling the switching rate of a sawtooth wave generating circuit according to the horizontal and vertical sync signals H-SYNC and V-SYNC applied from the video card 120.

Vertical drive circuit 232 boosts the vertical oscillating pulse sent from the horizontal and vertical oscillating signal processor 231 and generates a drive current.

As regards vertical drive circuit 232, two types are most widely used: a one-stage vertical amplification type and an emitter follower type. The emitter follower type vertical drive circuit has a transistor which receives an input signal at its base and generates an output signal at its emitter. Accordingly, vertical drive circuit 232 normally performs an operation for the improvement of linearity instead of gain. The drive current amplified through the vertical drive circuit 232 is applied to a vertical output circuit 233, which supplies a sawtooth current in accordance with the vertical sync pulse to a deflection yoke DY, thereby determining a vertical scanning period.

On the other hand, horizontal drive circuit 234 receives a horizontal oscillating signal generated by the horizontal and vertical oscillating processor 231, and supplies a drive current high enough to switch the horizontal output circuit 235. Upon receipt of the drive current from the horizontal drive circuit 234, the horizontal output circuit 235 provides a sawtoothed current to the deflection yoke DY, thereby determining a horizontal scanning period.

There are two driving methods for such a horizontal drive circuit 234: an in-phase type wherein the output is ON when the drive terminal is ON, and an out-of-phase type wherein the output is OFF when the drive terminal is ON.

In order to supply a high voltage to the anode terminal A of a CRT (Cathode Ray Tube) 300, high-voltage circuit 236 and FBT (FlyBack Transformer) 237 are driven to generate the high voltage according to the period of the horizontal oscillating pulse generated by the horizontal and vertical oscillating signal processor 231. The generated high voltage is applied to the anode terminal A of the CRT 300 to create an anodic surface of the CRT 300.

Video pre-amplifier 241 of the video circuit section 240 amplifies the low-level R, G and B video signals generated by the video card 120 to a specified voltage level. For example, a signal of less than 1 peak to peak voltage (hereinafter, referred to as $V_{pp}$) is boosted to a signal Of 4 to 6 $V_{pp}$. Video output amplifier 243 further boosts the R, G and B video signals of 4 to 6 $V_{pp}$ to those of 40 and 60 $V_{pp}$, supplying energy to the respective pixels of the CRT 244 so as to display an image.

The picture displayed through the CRT 300 according to the R, G and B video signals has its scanning periods determined by the deflection yoke DY, and is visually displayed on the screen of the CRT 300 with the luminance controlled on the anodic surface of the CRT 300.

An alternating current (hereinafter, referred to as "AC") is fed into the power supply circuit section 250 through an AC input 251, and the power supply circuit section 250 provides a drive voltage for displaying the R, G and B video signals on the screen of the display monitor 200. The AC is applied to a degaussing coil 252 so as to troubleshoot the fuzzy indistinct colors caused by the influence of the earth magnetic field or the external environment.

Furthermore, the AC supplied through the AC input 251 is rectified into a direct current (DC) through a rectifier 253, and the DC is applied to a switching transformer 254. The switching transformer 254 then supplies various drive voltages required in the display monitor 200 through a voltage regulator 255. In this case, PWM (Pulse Width Modulation) IC 256 senses the error of the drive voltage generated through the voltage regulator 255, and controls the switching time according to the sensed error so as to stabilize the voltage generated through the voltage regulator 255.

In order to economize power consumed in the display monitor 200, microcomputer 220 is under the control of a DPMS (Display Power Management Signaling) mode in response to the input of the sync signals generated by the video card 120. In the DPMS mode, the microcomputer 220 enters the standby mode to interrupt the R, G and B video signals if the horizontal sync signal H-SYNC is "off", while it enters the suspend mode to interrupt the deflection voltage with the vertical sync signal V-SYNC being "off".

Once the horizontal and vertical sync signals H-SYNC and V-SYNC are interrupted, the DPMS offmode is activated to interrupt the power supply to the secondary terminal of the switching transformer 254 through the PWM IC 256 in order to reduce power consumption in the display monitor 200.

In recent times, display monitor 200 has been reset by use of a soft power key, but an erroneous operation of the soft power key may cause a latch up.

When the latch up is caused by the use of the soft power key, it becomes impossible to reset the display monitor 200 with the soft power key, and this is a problem for the user.

Figure 2:
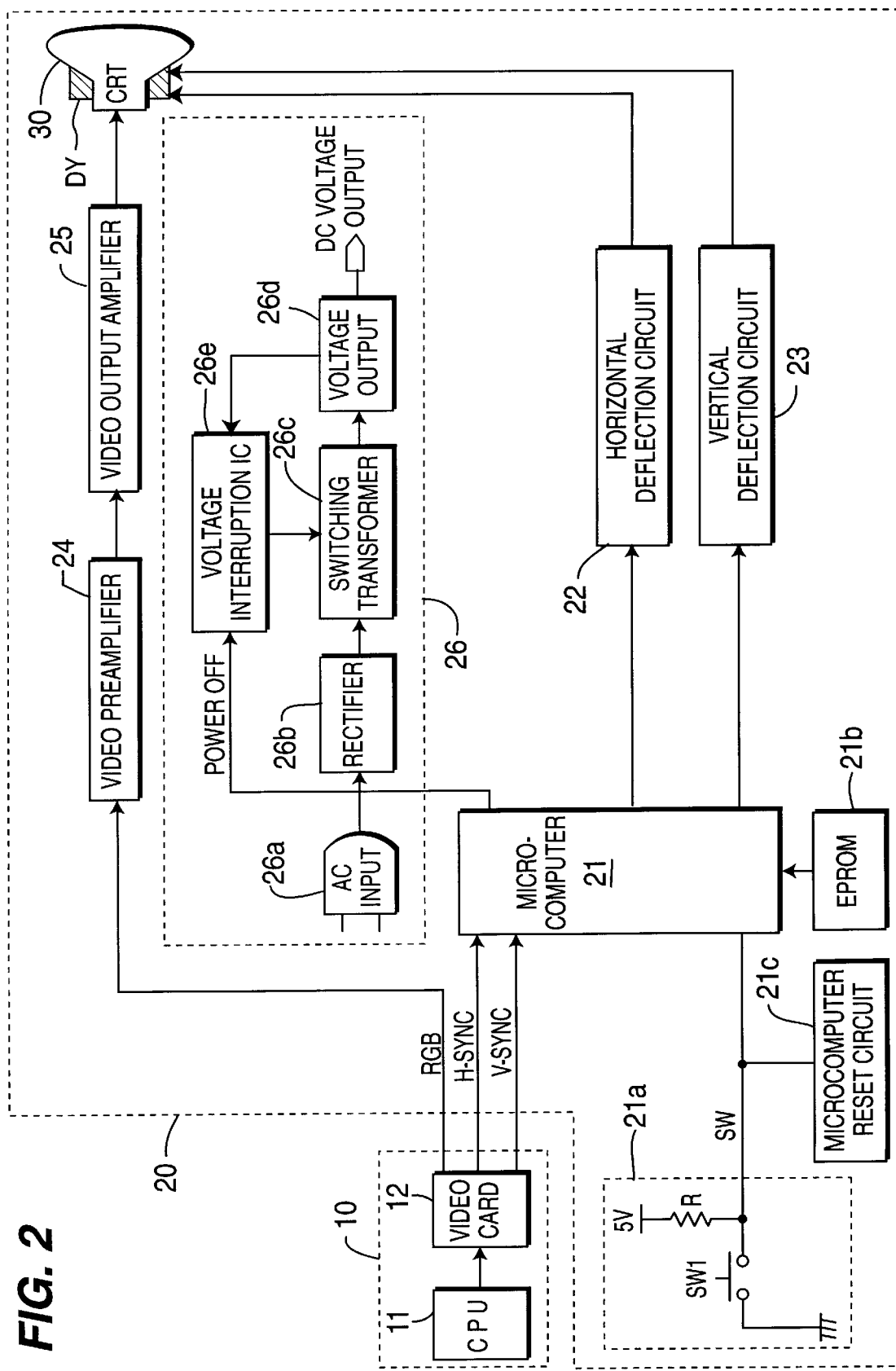
FIG. 2 is a block diagram of the internal circuit of a display monitor in accordance with the present invention.

FIG. 2 is a block diagram of the internal circuit of a display monitor in accordance with the present invention.

As shown in FIG. 2, computer 10 is composed of a CPU 11 for processing a keyboard signal to generate output data, and a video card 12 for processing the data received from the CPU 11 into R, G and B video signals and further generating horizontal and vertical sync signals H-SYNC and V-SYNC, respectively, which are to synchronize the R, G and B video signals.

Display monitor 20, which displays the R, G and B video signals received from the video card 12 in the computer 10, comprises: a soft power key section 21a and microcomputer reset circuit 21c for generating a reset signal; an EPROM 21b which stores data concerning the power-on/off state before the operation of the soft power key section 21a and image adjusting data; a microcomputer 21 for reading the power-on/off state data stored in the EPROM 21b to switch the power state of the display monitor 20 to the new state before latch up if a power-off signal is generated with the operation of the soft power key section 21a and a latch up occurs during the use of the soft power key, and generating horizontal and vertical oscillating signals in response to the horizontal and vertical sync signals H-SYNC and V-SYNC, respectively, generated by the video card 12 of the computer 10; a horizontal deflection circuit 22 for providing a horizontal sawtooth current to a deflection yoke DY in response to the horizontal oscillating signal generated by the is microcomputer 21; a vertical deflection circuit 23 for providing a vertical sawtooth current to the deflection yoke DY in response to the vertical oscillating signal generated by the microcomputer 21; a video pre-amplifier 24 for boosting the R, G and B video signals generated by the video card 12 to a specified level; a video main amplifier 25 for further boosting the R, G and B video signals and supplying them to a CRT 30 for display according to the periods of the horizontal and vertical sawtooth current generated by the deflection yoke DY; and a power supply circuit section 26 for rectifying an AC voltage into a DC voltage as a drive voltage required for the respective circuit blocks, and switching the output of the DC voltage according to the presence of the power-off signal generated by the microcomputer 21.

The power supply circuit 26 comprises an AC input 26a provided with an AC signal; a rectifier 26b for rectifying the AC of the AC input 26a into a DC; a switching transformer 26c for switching the DC generated by the rectifier 26b and providing it at its secondary terminal; a voltage output 26d for rectifying the voltage generated by the secondary terminal of the switching transformer 26c and generating the DC voltage required for the respective circuit blocks; and a PWM IC or voltage interruption IC 26e for sensing the error of the DC voltage generated from the voltage output 26d, stabilizing the period of time when the switching transformer 26c is turned on, and interrupting the DC voltage generated by the voltage output 26d in response to the power-off signal POWER OFF received from the microcomputer 21.

The soft power key section 21a is composed of resistance R and switch SW1 for applying a DC voltage of 5 volts.

In case of a latch up taking place during the use of the soft power key section 21a, the microcomputer 21 reads the power-on/off state data stored in the EPROM 21b, and switches the power state of the display monitor 20 to the new state before the use of the soft power key section 21a. A detailed description of this method is given below with reference to FIG. 3.

Figure 3:
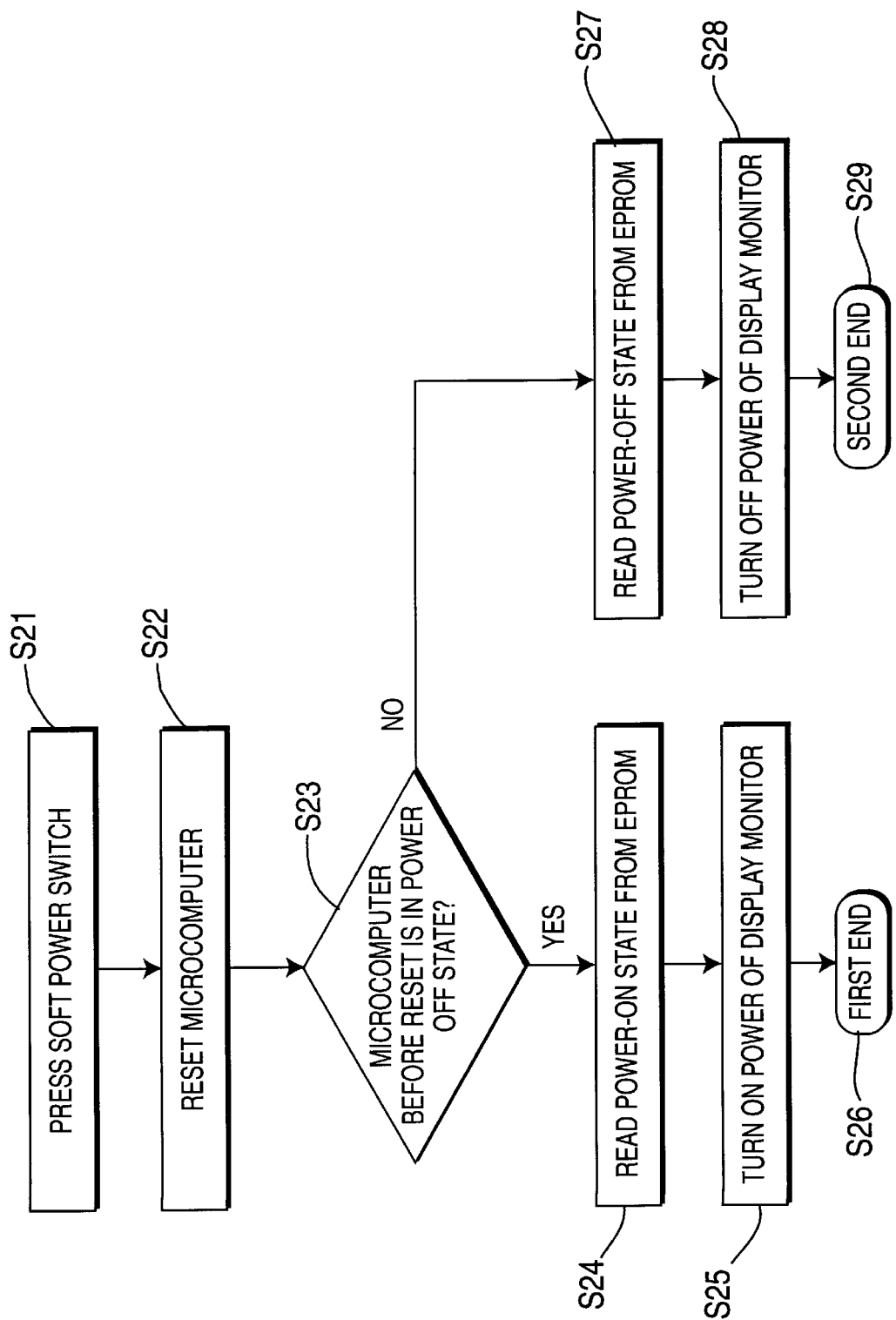
FIG. 3 is a flow chart illustrating a powerswitching method of a display monitor through the reset of a microcomputer in accordance with the present invention.

FIG. 3 is a flow chart illustrating a powerswitching method of a display monitor through the reset of the microcomputer in accordance with the present invention.

As shown in the figure, the method includes the steps of: (S21) applying a switch signal SW of the soft power key section 21a for the reset of the display monitor 20; (S22) resetting the microcomputer 21 by means of reset circuit 21c in response to the switch signal SW from the soft power key section 21a; (S23) checking the power-on/off state of the microcomputer 21 before the reset step S22; (S24) reading the power-on state from the EPROM 21b when the microcomputer 21, before the reset step S22, is in the power-off state; (S25) turning on the power of the display monitor 20; (S26) ending the powerswitching operation when the power of the display monitor 20 is turned on; (S27) reading the power-off state from the EPROM 21b when the microcomputer 21, before the reset step S22, is in the power-on state; (S28) turning off the power of the display monitor 20; and (S29) ending the powerswitching operation when the power of the display monitor 20 is turned off.

Below is a description of the switching operation for the power of the display monitor through the reset of the microcomputer according to the invention.

Display monitor 20 receives the horizontal and vertical sync signals H-SYNC and V-SYNC, respectively, generated by the video card 12 of the computer 10, and the microcomputer 21 discriminates information concerning the R, G and B video signals of the video card 12, such as resolution or frequency. Reading the resolutions or frequencies of the R, G and B video signals, and the image adjusting data stored in the EPROM 21b, the microcomputer 21 generates horizontal and vertical oscillating signals.

The horizontal oscillating signal generated by the microcomputer 21 is applied to the horizontal deflection circuit 22 and switched so as to provide a sufficiently high horizontal sawtooth current to the deflection yoke DY. Further, the vertical deflection circuit 23 provides a vertical sawtooth current to the deflection yoke DY in response to the vertical oscillating signal received from the microcomputer 21.

The horizontal and vertical sawtooth currents generated by the deflection yoke DY are used to determine the scanning periods of the R, G and B video signals displayed in the CRT 30. The R, G and B video signals in this case are boosted by video pre-amplifier 24 and video main amplifier 25 to a specified level high enough, as determined in their scanning periods according to the periods of the horizontal and vertical sawtooth currents generated by the deflection yoke DY, and displayed on the screen of the CRT 30.

As the user presses the switch SW1 of the soft power key section 21a, the microcomputer 21 is reset by circuit 21c in step S21. Once the switch SW1 is chosen, a voltage of 5 volts is fed into the soft power key section 21a via resistance R so as to apply a key signal to the microcomputer 21.

Upon receipt of the key signal generated from the switch SW1 of the soft power key section 21a, the microcomputer 21 is reset in step S22. In the case where an erroneous operation of the soft power key section 21a takes place, the microcomputer 21 is latched up. In the latch up state, the power-on/off state of the microcomputer 21 before reset is checked. That is, the microcomputer 21 stores the power state before the use of the soft power key section 21a in the EPROM 21b.

Accordingly, if the microcomputer 21 is in the power-off state in step S23, it reads the power-on state from the EPROM 21a in step 24, and the power of the display monitor 20 is turned on in step S25.

Once the power of the display monitor 20 is switched "on", the powerswitching operation of the display monitor 21 is terminated in step S26.

Furthermore, if the microcomputer 21 is determined to be in the power-on state in step S23, it reads the power-off state from the EPROM 21a in step 27, and the power of the display monitor 20 is turned off in step S28.

Once the power of the display monitor 20 in switched "off", the powerswitching operation or the display monitor 21 is terminated in step S29.

In switching the power of the display monitor 20, the power supply circuit section 26 in controlled, according to the presence of the power-off signal POWER OFF generated by the microcomputer 21, so as to switch the output of the DC voltage.

As described above, once a latch up occurs due to the use of the soft power key 21a, the power state before the latch up is checked to switch the power of the display monitor 20 so that the latch up is prevented.

In the present invention as described above, when a use of the soft power key 21a causes a latch up in a display monitor 20 with the soft power key 21a, the latch up can be interrupted by reading the power state of the display monitor 20 before the latch up, from a memory 21b and by switching the power state to the state before the latch up of the display monitor 20.

It will be apparent to those skilled in the art that various modifications and variations can be made in the power-switching device and method of a display monitor through the reset of a microcomputer according to the present invention without departing from the spirit or scope of the invention. Thus, it is intended that the present invention cover the modifications and variations of this invention provided they come within the scope of the appended claims and their equivalents.

What is claimed is:

1. A device for powerswitching a display monitor through reset of a microcomputer, comprising:

soft power key means for generating a reset signal;

memory means for storing data concerning power-on and power-off states of the display monitor before operation of the soft power key means;

microcomputer means for generating a power-off signal in response to use of the soft power key means, said microcomputer means being responsive to occurrence of a latch up during the use of the soft power key means for reading the data stored in the memory means and for switching a power state of the display monitor to a state before the latch up; and power supply circuit means controlled according to presence of the power-off signal generated by the microcomputer means for switching a DC voltage output of the power supple circuit means.

2. The device of claim 1, wherein said soft power key means comprises a resistor connected between a power supply and an input of said microcomputer means, and a switch actuable by a user and disposed between a ground, on the one hand, and said resistor and said input of said microcomputer means, on the other hand.

3. The device of claim 1, wherein said memory means comprises an erasable programmable read-only memory.

4. A method for powerswitching a display monitor through reset of a microcomputer, comprising the steps of:

resetting the microcomputer in response to a switch signal from a soft power key section;

checking a power-on/off state of the microcomputer before the reset;

if the microcomputer before the reset is in the power-off state, reading power-on state data from a memory and turning on power to the display monitor; and if the microcomputer before the reset is in the power-on state, reading power-off state data from the memory and turning off power to the display monitor.

5. The powerswitching method as defined in claim 4, further comprising the step, after the step of turning on the power to the display monitor, of ending a power-switching operation.

6. The powerswitching method as defined in claim 4, further comprising the step, after the step of turning off the power to the display monitor, of ending a power-switching operation.

7. The power switching method as defined in claim 4, wherein said memory comprises an erasable programmable read-only memory (EPROM).

8. A device for powerswitching a display monitor through reset of a microcomputer, comprising:

a soft power key section for generating a switch signal;

reset means responsive to the switch signal for resetting the microcomputer;

determining means for determining a power-on/off state of the microcomputer before the reset;

memory means for storing power-on state data and power-off state data of said microcomputer; and reading means for reading the power-on state data from said memory means if said microcomputer is in the power-off state prior to reset, and for reading the power-off state data from said memory means if the microcomputer is in the power-on state before reset.

9. The device of claim 8, further comprising means for turning off power to the display monitor after said reading means reads said power-off state data from said memory means.

10. The device of claim 8, wherein said memory means comprises an erasable programmable read-only memory.

11. The device of claim 8, further comprising means for ending a powerswitching operation after the power to the display monitor is turned off.

12. The device of claim 10, further comprising means for ending a powerswitching operation after the power to the display monitor is turned on.

13. The device of claim 8, further comprising means for turning on power to the display monitor after said reading means reads said power-on state data from said memory means.

* * * * *